July 4, 1967  E. L. SINK  3,329,803
FISH TAPE CONSTRUCTION
Filed April 9, 1965
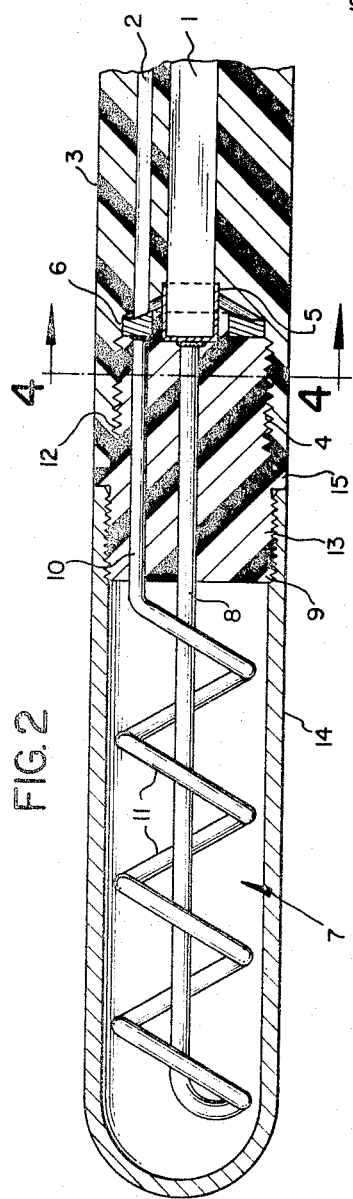
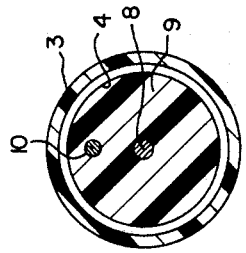
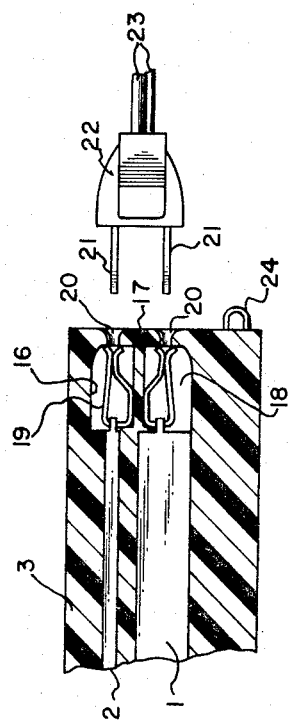
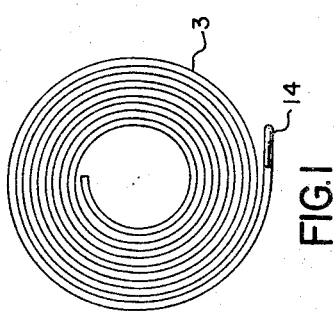
INVENTOR.
Elmore L. Sink
BY
Learman, Learman & McCulloch
ATTORNEYS

United States Patent Office 3,329,803
Patented July 4, 1967

3,329,803
FISH TAPE CONSTRUCTION
Elmore L. Sink, 1455 Delta, Saginaw, Mich. 48603
Filed Apr. 9, 1965, Ser. No. 446,875
10 Claims. (Cl. 219—546)

ABSTRACT OF THE DISCLOSURE

A fish tape having an electrical heater connected to one end of a stiff but coilable, electrically conductive tape and to a corresponding end of a second conductor, the tape and the second conductor being electrically insulated from each other.

---

This invention relates to fish tape constructions of the kind adapted to insert wires and the like through conduits, and more particularly to a fish tape construction which is provided with electrically operated heating means so as to enable the fish tape not only to be used for its customary purpose, but also to enable the fish tape to be used to melt ice obstructions in the conduits through which the wires or lines must be laid.

In the construction trade it frequently is necessary for long lengths of wiring to be installed in tubular conduits which may be located either above or below ground level, or both. It is not uncommon for such conduits to become filled or partially filled with water which subsequently freezes so as to block the conduits. In such instances, it is difficult to apply heat to the ice so as to melt the latter readily. As a consequence, considerable time may be lost due to a relatively small block of ice located at some remote point along the length of the conduit.

An object of this invention is to provide a fish tape construction which is capable of performing the functions of conventional fish tapes, and which also is capable of applying sufficient heat in a localized zone to melt any ice which may be present in a conduit.

Another object of the invention is to provide an electrified fish tape construction which is relatively inexpensive to manufacture and which is capable of negotiating rather sharp bends in a conventional conduit.

A further object of the invention is to provide an electrified fish tape construction which is so constructed as to be capable of applying heat directly to any formation of ice within a conduit, thereby dispensing with the necessity of having to conduct heat along the length of the conduit.

Other objects and advantages of the invention will be pointed out specifically or will become apparent from the following description when it is considered in conjunction with the appended claims and the accompanying drawing, in which:

FIGURE 1 is a plan view of an electrified fish tape constructed in accordance with the invention and illustrating the tape coiled in the position it occupies when it is not in use;

FIGURE 2 is a fragmentary, transverse sectional, greatly enlarged view of one end of the tape;

FIGURE 3 is a similar view of the opposite end of the tape; and

FIGURE 4 is a transverse sectional view taken on the line 4—4 of FIGURE 2.

Apparatus constructed in accordance with the disclosed embodiment of the invention comprises an elongated, stiff but coilable band or tape 1 formed of spring steel or other suitable electrically conductive material. The tape member 1 is a conventional, readily obtainable part and may be either circular or rectangular in cross-section. Parallel to the tape member 1 is an electrically conductive wire 2 which is coextensive in length with the tape member 1.

Both the tape member 1 and the wire 2 are maintained in parallel, electrically isolated relation by a flexible, electrically insulating member 3 which is molded around both of the members 1 and 2. The member 3 may be formed of rubber or other suitable insulating material of a synthetic nature such as polychloroprene or the like and, if desired, the insulating member 3 may be impregnated with polytetrafluoroethylene so as to facilitate its slipping through a metal or other conduit. If desired, the exterior of the member 3 may be provided with measuring indicia (not shown).

As is illustrated in FIGURE 2, the forward end of the insulating member 3 is provided with an internally threaded cavity 4 into which both of the members 1 and 2 project. A metallic ferrule 5 is accommodated in the cavity 4 and snugly receives the forward end of the tape member 1. Also received in the cavity 4 is an annular, metallic washer 6 against which the conductor 2 abuts.

An electrical heating element 7 of known construction is included and comprises an elongated terminal rod 8 that is supported in a coupling plug 9 formed of any known material having good electrical and thermal insulating properties, and having a second, spaced apart terminal rod 10 that is parallel to the terminal rod 8 and also is supported in the plug 9. The rear end of the plug 9 is threaded as at 12 to correspond to the threading of the cavity 4 and may be removably secured in the latter with the terminals 8 and 10 abutting the members 5 and 6, respectively. The terminals 8 and 10 are joined to each other by resistance coils 11 in circuit with the members 1 and 2 and which become heated when electrical current is passed through them.

The plug 9 also is provided with a forwardly, externally threaded portion 13 on which is mounted a correspondingly threaded, hollow tube or head 14 formed of heat radiating material such as steel or the like. Between the threaded portions 12 and 13 of the plug 9 is an annular flange 15 which is interposed between the forward end of the insulating member 3 and the rearward end of the head 14 so as to protect the member 3 from heat conducted by the head 14. The arrangement is such that the head 14 and its associated parts extend in prolongation of the members 1, 2 and 3, and the head 14 is flush with the exterior of the member 3.

At the rear end of the member 3 is a recess or socket 16 that is divided into two parts by a partition 17. Both of the members 1 and 2 project into the recess 16, but on opposite sides of the partition. To the tape member 1 is joined an electrically conductive clip 18 and to the conductor 2 is joined a similar conductive clip 19. Adjacent each clip is an opening 20 through which blades 21 of a conventional electric plug 22 may extend, the blades 21 being connected by wires 23 to a source of electrical energy.

If desired, one or more loops 24 may be secured to the rear end of the member 3 and to which one or more wires may be connected so as to permit the wires to be pulled through a conduit in the conventional manner.

In the use of the apparatus, and assuming that there is no ice which blocks the conduit, the head 14 of the apparatus may be inserted in a conduit and be pushed through the latter in the same manner as conventional fish tapes presently are used. Wires attached to the loops 24 will be pulled through the conduit with the fish tape.

In those instances where ice blocks the conduit, the members 1 and 2 may be connected to a source of electrical energy so as to cause the heating coils 11 to radiate heat which is transmitted by the head 14 directly to the ice so as to melt the latter and enable the fish tape and the wires attached thereto to be drawn through the conduit.

The apparaus is not restricted in its use to the laying of wires in conduits, but has other uses. For example, the apparatus is highly useful in thawing frozen water pipes.

The disclosed embodiment is representative of a presently preferred form of the invention but is intended to be illustrative rather than definitive thereof. The invention is defined in the claims.

I claim:

1. A fish tape construction comprising an elongated, coilable tape member formed of electrically conductive material of sufficient stiffness to permit it to be pushed through a conduit; an electrical heating element; means mounting said heating element at one end of said tape member in prolongation of the latter and in electrical connection therewith; and coilable electrically conductive means connected to said heating element in circuit with said tape member for heating said heater element.

2. A fish tape construction comprising an elongated, stiff but coilable tape member formed of electrically conductive material; an electric heating element joined to one end of said tape member in prolongation of the latter; a coilable electrical conductor member joined to said heating element in circuit with said tape member and extending substantially parallel to the latter; and coilable insulating means interposed between said tape member and said conductor member and electrically isolating the latter.

3. A fish tape construction comprising an elongated, stiff but coilable tape member formed of electrically conductive material; a coilable, electrical conductor member substantially parallel to and isolated from said tape member; an electrical heater element in prolongation of said tape member and having its terminals connected respectively to said tape member and to said conductor member; a heat radiating head enclosing said heater element; and means securing said head on said tape member.

4. The construction set forth in claim 3 wherein said securing means comprises electrical insulating means maintaining said members in spaced apart, electrically isolated positions.

5. The construction set forth in claim 4 wherein said insulating means includes a socket remote from said head and adapted for the removable accommodation of an electrical plug.

6. A fish tape construction comprising an elongated, stiff but coilable tape member formed of electrically conductive material; a coilable, electrically conductive member substantially parallel to said tape member; a coilable insulating member surrounding said members and maintaining them in spaced relation, said insulating member having a recess at each of its ends; an electrical heating element; means mounting said element in one of said recesses in prolongation of said tape member and in circuit with the latter and with said conductor member; and electrically conductive means in the other of said recesses for connecting said members to a source of electric energy.

7. The construction set forth in claim 6 including a heat radiating head fully enclosing said element.

8. The construction set forth in claim 7 including thermal insulating means interposed between said head and said insulating means.

9. A fish tape construction comprising an elongated, stiff but coilable tape member formed of electrically conductive material; a coilable, electrically conductive member substantially parallel to said tape member; a coilable insulating member surrounding said members and maintaining them in spaced relation, said insulating member having a recess at least at one of its ends; a first conductive element accommodated in said recess in engagement with said tape member; a second conductive element accommodated in said recess in engagement with said conductive member; an electrical heating element having a pair of electrodes; coupling means supporting said electrodes and accommodated in said recess with said electrodes in engagement with said first and second elements, respectively; a heat radiating head enclosing said heating element and secured to said coupling means; and electrically conductive means at the other ends of said members for connecting said members to a source of electric energy.

10. The construction set forth in claim 9 wherein said coupling means is formed of thermal insulating material and includes a part interposed between said head and said insulating member.

References Cited

UNITED STATES PATENTS

| | | | |
|---|---|---|---|
| 1,858,003 | 5/1932 | Downey | 219—523 X |
| 2,178,397 | 10/1939 | Larkey | 219—523 X |
| 2,223,154 | 11/1940 | Thornton-Norris | 219—523 X |
| 2,516,950 | 8/1950 | Bragg | 219—523 |
| 2,712,590 | 7/1955 | Doble | 219—523 X |
| 2,766,367 | 10/1956 | Chaustowich | 219—523 |

RICHARD M. WOOD, *Primary Examiner.*

ANTHONY BARTIS, *Examiner.*

C. L. ALBRITTON, *Assistant Examiner.*